United States Patent
Kim et al.

(10) Patent No.: US 8,295,348 B2
(45) Date of Patent: Oct. 23, 2012

(54) METHOD FOR CONTROLLING MOVING PICTURE ENCODING USING CHANNEL INFORMATION OF WIRELESS NETWORKS

(75) Inventors: Yong-Gyoo Kim, Seoul (KR); Tae-Sung Park, Yongin-si (KR); Jae-Hoon Kwon, Seongnam-si (KR); Do-Young Joung, Seoul (KR); Sung-Kee Kim, Suwon-si (KR); Chang-Hyun Lee, Seoul (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 1128 days.

(21) Appl. No.: 12/176,506

(22) Filed: Jul. 21, 2008

(65) Prior Publication Data

US 2009/0022218 A1 Jan. 22, 2009

(30) Foreign Application Priority Data

Jul. 19, 2007 (KR) .................. 10-2007-0072370

(51) Int. Cl.
*H04N 11/02* (2006.01)

(52) U.S. Cl. .................................. 375/240.07
(58) Field of Classification Search .................. None
See application file for complete search history.

(56) References Cited

U.S. PATENT DOCUMENTS

| 5,907,563 | A  * | 5/1999 | Takeuchi et al. | 714/751 |
| 2003/0031251 | A1 * | 2/2003 | Koto | 375/240.03 |
| 2005/0008079 | A1 * | 1/2005 | Boon et al. | 375/240.27 |
| 2006/0104370 | A1 * | 5/2006 | Yamanaka et al. | 375/242 |
| 2006/0109339 | A1 * | 5/2006 | Chao et al. | 348/14.01 |
| 2009/0219992 | A1 * | 9/2009 | Wang | 375/240.03 |

* cited by examiner

*Primary Examiner* — Gregory Sefcheck
*Assistant Examiner* — Amar Persaud
(74) *Attorney, Agent, or Firm* — Cha & Reiter, LLC

(57) ABSTRACT

Disclosed is a method for controlling bit rates in consideration of wireless channel environment by an apparatus that transmits and receives moving picture encoding data via a wireless network. The apparatus for transmitting/receiving data through a wireless communication network connected to the apparatus including a channel state analyzing unit for analyzing a wireless channel environment, an encoding controller for generating control information containing information about a quantization parameter, skip or non-skip of frames indication, frame type indication, and use or non-use of an Error Resilient Tool (ERT) indication, in consideration of an analyzation result received from the channel state analyzing unit, a moving picture encoding unit for encoding incoming moving picture data, based on the control information received from the encoding controller; and a data transmitting/receiving unit for transferring the encoded moving picture data through the wireless channel to an exterior.

20 Claims, 5 Drawing Sheets

METHOD FOR CONTROLLING MOVING PICTURE ENCODING USING CHANNEL INFORMATION OF WIRELESS NETWORKS

CLAIM OF PRIORITY

This application claims the benefit of the earlier filing date, under 35 U.S.C. §119(a), to that patent application entitled "Method for Controlling Moving Picture Encoding using Channel Information of Wireless Networks" field in the Korean Intellectual Property Office on Jul. 19, 2007 and assigned Serial No. 2007-72370, the contents of which are hereby incorporated by reference.

BACKGROUND OF THE INVENTION

1. Field of the Invention

The present invention relates to wireless communications, and more particularly to a method for controlling bit rates in consideration of wireless channel environments for transmitting and receiving moving picture encoding data via a wireless communication network.

2. Description of the Related Art

Various digital moving-picture compression technologies for maintaining image quality at a high level while supporting a low data rate on transmitting or storing moving picture signals have been proposed. For example, a Discrete Cosine Transform (DCT) technique or a Motion Compensation (MC) technique are exemplary compression technologies have achieved a relatively high compression rate.

However, during the encoding of the moving picture data, the moving picture data suffers loss of temporal and/or spatial information while passing through predicative encoding, transformation, and quantization processes, and previous data and next data within a bit stream may have a close interrelation by a Variable Length Encoding (VLC).

Therefore, when an error occurs in a transmission channel in transmitting data having this interrelation, it is difficult to restore not only data at the point of time when the error occurs but also data after the occurrence of the error.

Meanwhile, because of the characteristics of a wireless communication network, traffic congestion may occur on a specific channel, or transmission and/or reception bandwidth may be continually varied due to an increase or a decrease in the number of users within an area covered by a wireless base station. In addition, there may exist a circumstance where a data transmitting/receiving apparatus connected to the wireless communication network either moves within an area in which handover may occur, or moves toward a shadow zone incapable of wireless radio wave transmission/reception.

In the case of transmitting encoded moving picture data via a wireless communication network (e.g., in the case of transmitting moving picture data in real-time streaming during encoding), due to the above-described circumstance, a transmitting side for transmitting the moving picture data may have an inferior wireless channel characteristic, or a receiving side may have an inferior wireless channel characteristic even if the transmitting side has a superior wireless channel characteristic. In this case, a moving picture received in a data transmitting/receiving apparatus of the receiving side undergoes significant image quality degradation due to the loss or quality degradation due to a broken image (e.g., image interruption).

In order to solve the above-described problem, there is a need for encoding moving picture data in consideration of channel environments of a wireless communication network, so as to avoid degradation of image quality.

SUMMARY OF THE INVENTION

The present invention provides a method for measuring and analyzing a wireless channel environment, and controlling moving picture encoding based on the measured wireless channel environment.

Also, the present invention provides a method for controlling moving picture encoding in reflection of a change in a wireless channel environment in real-time.

In accordance with an aspect of the present invention, there is provided an apparatus for at least transmitting data through a wireless communication network connected to the apparatus, the apparatus including: a channel state analyzing unit for analyzing a wireless channel environment, an encoding controller for generating control information containing information about at least one of: a quantization parameter, skip or non-skip frames indication, a frame type, and use or non-use of an Error Resilient Tool (ERT) indication, in consideration of an analysis received from the channel state analyzing unit; a moving picture encoding unit for encoding incoming moving picture data, based on the control information received from the encoding controller; and a data transmitting unit for transferring the encoded moving picture data through the wireless channel.

The encoding controller may identify an available bandwidth of the wireless channel environment and generate control information containing at least one of a quantization parameter and a skip or non-skip of a moving picture frame indication, generate control information used to reset a type of the moving picture frames when the wireless channel environment corresponds to an environment where hand-over or data loss may occur, and generate control information that does not use the ERT when the wireless channel environment corresponds to a shadow zone or uses the ERT when the wireless channel environment does not correspond to a shadow zone.

In one aspect, the encoding controller sets an average value of quantization parameters of frames within a preset range to a quantization parameter of an I frame.

In one aspect, the preset range is set to comprise a smaller number of frames between the initially set frames and the number of frames to a current frame after change of the available bandwidth.

The encoding controller may increase or decrease a quantization parameter of a previous frame to set the resulting parameter to a quantization parameter of an I frame, when an indication that the available bandwidth has been changed is received just before an I frame encoding.

In one aspect, the encoding controller may determine a quantization parameter in consideration of a relationship between a wireless channel available bandwidth and encoding complexity, and does not limit a change amount of a quantization parameter of a next frame when an indication that available bandwidth has been changed is received.

In one aspect, the encoding controller sets a skip of encoding of a next frame indicator when a buffer size exceeds a preset threshold.

The encoding controller may set a skip of encoding of a next frame indicator when the quantization parameter of the range is lower than or equal to a preset quantization parameter value and a cumulative output bit is higher than or equal to a preset output bit value.

The data transmitting/receiving unit may further include a function of receiving data transferred from an outside source, and further include a decoding unit for decoding the moving picture data received through the data transmitting/receiving unit.

In accordance with another aspect of the present invention, there is provided a method for encoding and transmitting moving picture data by at least a data transmitting apparatus connected to a wireless communication network, the method including the steps of analyzing a channel environment by identifying a wireless channel state, generating control information containing information about a quantization parameter, a skip or non-skip of frame indication, frame type indication, and use or non-use of an ERT indication, in consideration of a result of the analysis of the wireless channel environment, encoding moving picture data in reflection of the control information and transferring the encoded moving picture data through the wireless channel.

In the step of analyzing the channel environment, an available bandwidth of the wireless channel is identified and whether the wireless channel environment is an environment in which hand-over or an a shadow zone occurs is determined, wherein the step of generating the control information further includes the steps of: setting the ERT for the environment within a range of the shadow zone, resetting a type of a frame after the hand-over is terminated and generating at least one information selected from a quantization parameter and a skip or non-skip of a frame, or information constructed with a combination of both.

In the step of generating the control information, an average value of quantization parameters of frames within the preset range may be set to a quantization parameter of an I frame.

In the step of generating the control information, the preset range may be set to comprise a smaller number of frames between the initially set frames and the number of frames to a current frame after change of the available bandwidth.

In the step of generating the control information, when an indication that the available bandwidth has been changed is received just before encoding of an I frame, a quantization parameter of a previous frame may be either increased or decreased, and then the resulting quantization parameter may be set to a quantization parameter of an I frame.

In one aspect, in the step of generating the control information, a quantization parameter of a P frame is determined in consideration of relationship between an available bandwidth of a wireless channel and encoding complexity, and when the indication that the available bandwidth has been changed is received, the change amount of the quantization parameter of a next frame is not limited.

In one aspect, when the buffer size exceeds a preset threshold, encoding of a next frame is skipped.

The encoding of the next frame may be skipped when a quantization parameter of the range is lower than or equal to a preset quantization parameter value and a cumulated output bit is higher than or equal to a preset output bit value.

In accordance with another aspect of the present invention, there is provided a data transmitting/receiving system, the system including: a wireless communication network; a data transmitting apparatus connected to the wireless communication network, wherein the data transmitting apparatus includes a channel state analyzing unit for analyzing a wireless channel environment of a transmitting side, an encoding controller for generating control information, containing information about at least one of a quantization parameters, skip or non-skip of frames indication, setup of frame type indication, and use or non-use of an ERT indication, in consideration of the analysis of the wireless channel environment received from the channel state analyzing unit; a moving picture encoding unit for encoding incoming moving picture data based on the control information received from the encoding controller, and a communication module of the transmitting side for transferring the encoded moving picture data through the wireless channel, a data receiving apparatus connected to the wireless communication network, wherein the data receiving apparatus includes a communication module of a receiving side for receiving data transferred from wireless communication network, and a decoding unit for decoding the moving picture data received through the communication module of the receiving side.

In one aspect, the encoding controller identifies an available bandwidth of the wireless channel and determines at least one of a quantization parameter or a skip or non-skip of moving picture frame indication and resets a type of a moving picture frame when the wireless channel environment may correspond to a hand-over area or an environment where data loss may occur, and does not use the ERT when the wireless channel environment corresponds to a shadow zone and uses the ERT when the wireless channel environment does not correspond to the shadow zone.

The data receiving apparatus may further include a channel state analyzing unit for analyzing a wireless channel environment of the receiving side, determining occurrence or non-occurrence of frame loss, and transferring the result of the analysis to a channel state analyzing unit of the transmitting side.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE INVENTION

Exemplary embodiments of the present invention are described with reference to the accompanying drawings. In the following description, various specific definitions are provided only to assist in a general understanding of the present invention, and it is apparent to those skilled in the art that the present invention can be implemented without such definitions.

According to the present invention, when a terminal located at a transmitting side of a wireless network transmits moving picture data via the wireless network to a terminal located at a receiving side of the wireless network, it is possible to control moving picture encoding so that use or non-use of an output bit rate, an intra refresh, and an Error Resilient Tool (ERT) of a video encoder can be varied within a frame unit, based on rapidly changing wireless channel states (e.g. an available bandwidth, a Modulation and Encoding Scheme (MCS) level, location or non-location within a hand-over area, occurrence or non-occurrence of frame loss, location or non-location within a shadow zone, and so on.

Figure 1:
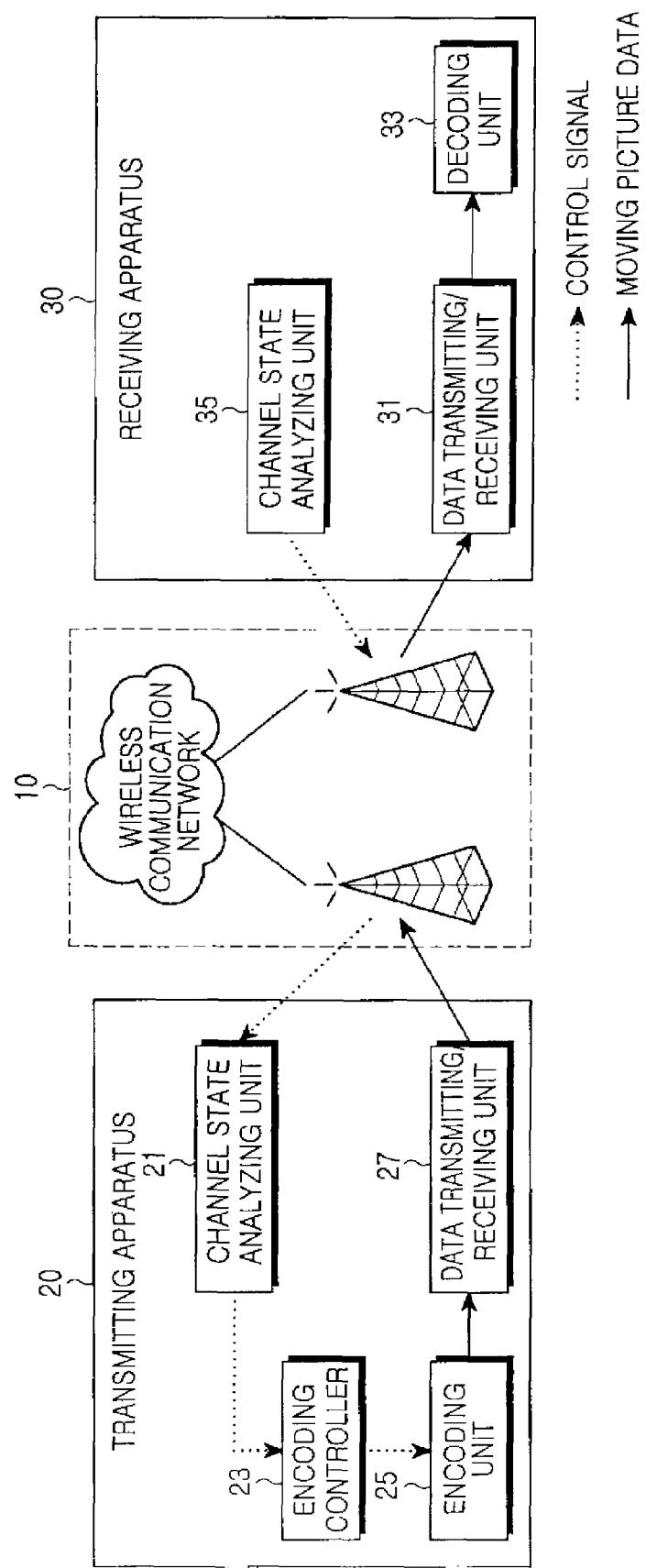
FIG. 1 is a block diagram illustrating a system for transmitting/receiving moving picture data according to one embodiment of the present invention.

FIG. 1 is a conceptual diagram illustrating a system for transmitting/receiving moving picture data according to one embodiment of the present invention.

Referring to FIG. 1, a data transmitting/receiving system according to the present invention includes a wireless communication network 10, a data transmitting apparatus 20, and a data receiving apparatus 30 that are respectively connected to the wireless communication network 10.

The data transmitting apparatus 20 includes a channel state analyzing unit 21 for identifying an available bandwidth of the wireless communication network and checking wireless channel states, an encoding controller 23 for generating control information used to control encoding of moving picture data in consideration of the wireless channel states, an encoding unit 25 for encoding moving picture data based on the control information, and a data transmitting/receiving unit 27 for transmitting encoded data to the data receiving apparatus 30.

The channel state analyzing unit 21 identifies the available bandwidth of the wireless channel, and then checks and analyzes a current state of a channel by measuring an error rate of an assigned wireless channel and an MCS level.

Further, the current state analyzed by the channel state analyzing unit 21 may include a state capable of stable data transmission, a state where hand-over has occurred, or a state where the data transmitting apparatus 20 or the data receiving apparatus 30 located at the shadow zone does not smoothly transmit data. Furthermore, the channel state analyzing unit 21 transfers information of one selected from the states or information constructed with combination of two or more states, as an analyzation result, to the encoding controller 23.

The encoding controller 23 references the analyzation result received from the channel state analyzing unit 21, and then sets use of the ERT according to whether or not the data transmitting apparatus 20 or the data receiving apparatus 30 is located in a shadow zone. Then, the encoding controller 23 identifies that the hand-over is completed after the hand-over occurrence, and then resets a type of incoming frames to an intra frame. For example, a P frame or a B frame is changed into an I frame. Further, the encoding controller 23 decides a quantization parameter of the encoding unit 25 in consideration of the MCS level or the available bandwidth included in the analyzation result, and an encoding complexity (e.g., Mean Absolute Difference (MAD)) of a previous frame having been received from the encoding unit 25, and then determines if encoding of the frames is skipped. If it is possible for the encoding unit 25 to set a target bit rate, the decision of the target bit rate may be substituted for the quantization parameter and a skip or non-skip of frame encoding. In the end, the encoding controller 23 generates control information containing at least one of a use or non-use of the ERT indication, the frame type, a target bit rate, a quantization parameter, and a skip or non-skip of encoding indication, based on the analyzation result received from the channel state analyzing unit 21.

The data transmitting/receiving apparatus according to an embodiment of the present invention may employ, for example, a general MPEG4 video encoder, as the encoding unit 25 for receiving video frame sequence, while outputting compressed video data, and perform moving picture encoding based on the control information.

The data transmitting/receiving unit 27 refers to a device for transferring data output from the encoding unit 25 to the data receiving apparatus 30 via wireless communication network 10.

The data receiving apparatus 30 includes a data transmitting/receiving unit 31 for receiving the moving picture data transferred via the wireless communication network, and a decoding unit 33 for decoding the received moving picture data according to a scheme corresponding to the encoding unit 25. In the embodiment of the present invention, when a MPEG4 based-encoder is employed as the encoding unit 25, the an MPEG4 based-decoder is employed as the decoding unit 33. As would be recognized, the invention described herein is not limited to MPEG-4 encoder/decoder and any video encoder/decoder may be incorporated without changing the scope of the invention.

The data receiving apparatus 30 may further include a channel state analyzing unit 35. The channel state analyzing unit 35 analyzes wireless channel states, and then transmits the analyzation result to the channel state analyzing unit 21 of the data transmitting apparatus 20. Therefore, the channel state analyzing unit 21 of the data transmitting apparatus 20 may generate wireless channel information in consideration of both the wireless channel information of the transmitting side and the wireless channel information of the receiving side.

Figure 2:
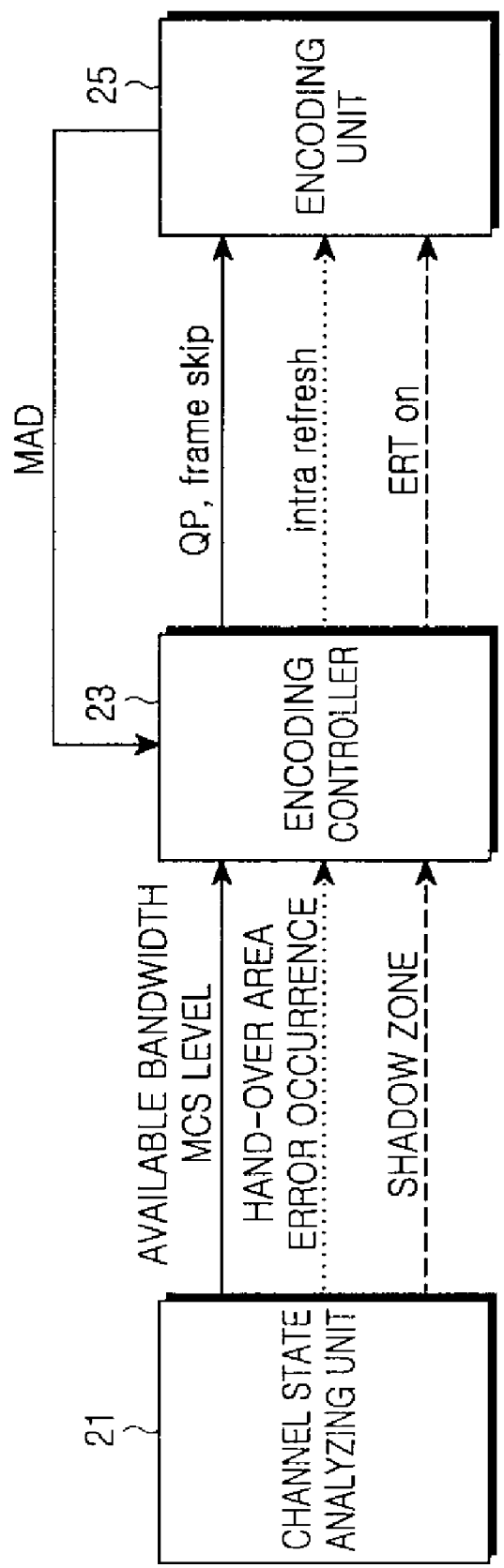
FIG. 2 is a block diagram illustrating a data flow between constructions of a transmitting apparatus provided within a data transmitting/receiving system according to one embodiment of the present invention.
Figure 3A:
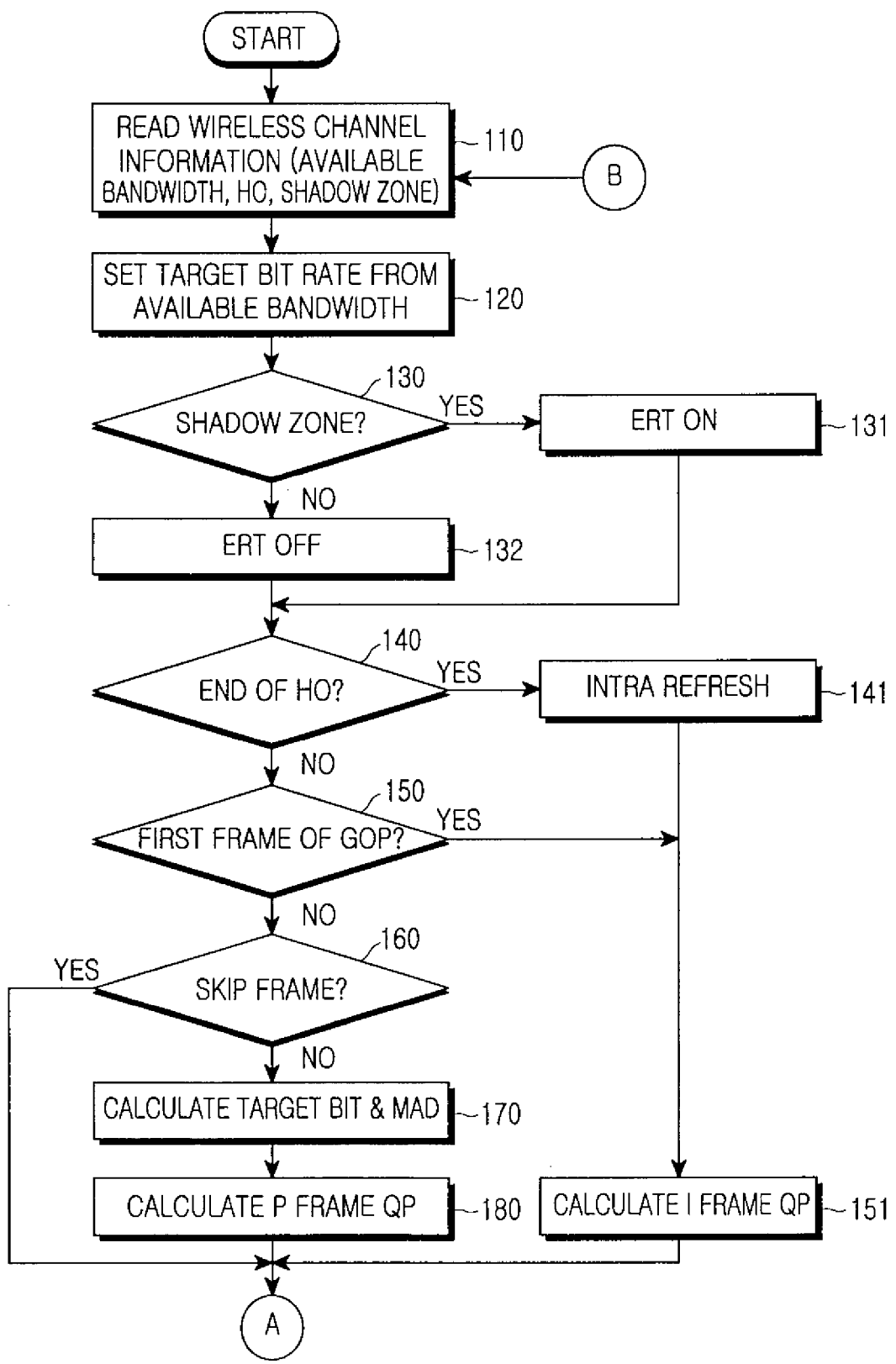
FIGS. 3A and 3B are flowcharts illustrating an encoding process of a transmitting apparatus provided within a system for transmitting/receiving moving picture data according to one embodiment of the present invention.
Figure 3B:
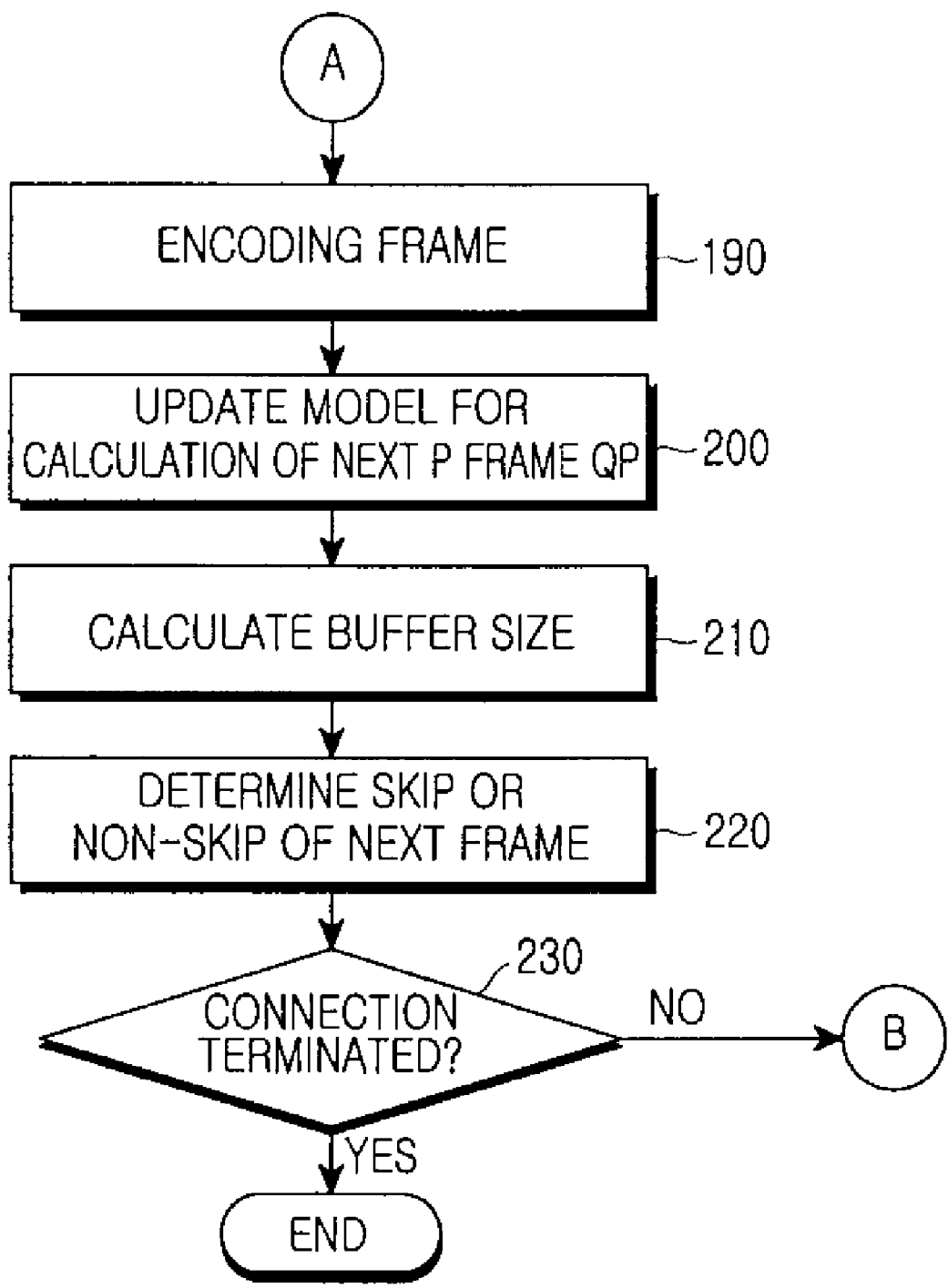

FIG. 2 is a block diagram illustrating a data flow between constructions of the transmitting apparatus provided within a data transmitting/receiving system according to one embodiment of the present invention, and FIGS. 3A and 3B are flowcharts illustrating an encoding process of a transmitting apparatus provided within a system for transmitting and receiving moving picture data according to one embodiment of the present invention.

The process of generating control information by the encoding controller according to an embodiment of the present invention will be described with reference to FIGS. 2 and 3A/3B.

First, the encoding controller 23 reads channel state information provided from the channel state analyzing unit 21 at a predetermined period (step 110). In this case, the channel state information may include information of an available bandwidth of the wireless channel, an MCS level, a possibility, or non-possibility, of stable data transmission, a state where the hand-over has occurred, or a state where the data transmitting apparatus 20 or the data receiving apparatus 30 are located within a shadow zone that does not smoothly transmit/receive data, and so on.

In step 120, the encoding controller 23 sets a target bit rate in consideration of the MCS level of the available bandwidth of the wireless channel contained in the channel state information.

In step 130, the encoding controller 23 identifies whether either the data transmitting apparatus 20 or the data receiving apparatus 30 is located in a shadow zone by using the information within the channel state information. When at least one of the two apparatuses (20, 30) is located at the shadow zone (if yes in step 130), the ERT is set to apply for the control information (step 131). Meanwhile, when both of the two apparatuses is not located at the shadow zone (if no in step 130), a separate ERT is set not to apply for the control information (step 132).

In step 140, the encoding controller 23 makes reference to information associated with occurrence or non-occurrence of hand-over (HO) from among the information within the channel state information, and then identifies if the hand-over is terminated. When the hand-over is terminated (if yes in step 140), the encoding controller 23 refresh a type of a current incoming frame to an intra frame (step 141). For example, the encoding controller 23 refreshes P frame or B frame to (intra)I frame. Meanwhile, when no hand-over occurs (if no in step 140), the encoding controller 23 proceeds to step 150.

In step 150, the encoding controller 23 identifies a type of the current incoming frame, and when the current incoming frame is a first frame of a frame group (Group of Picture: GOP), that is, an I frame (if yes in step 150), the encoding controller 23 calculates a quantization parameter of the I frame (step 151).

In step 151 the quantization parameter of the I frame is calculated by the encoding controller 23 as a value obtained by averaging quantization parameters of frames within a preset range (window size), wherein the frames within the window size are selected from among a plurality of frames in the moving picture. Since the target bit rate may be changed during a frame encoding procedure, the target bit rate must be implemented to achieve rapid application to the changed wireless channel environment. Therefore, according to changes in the wireless channel environment, the preset range is changed and applied. Particularly, a range having a relatively smaller value between an initially set range (e.g. Maximum Window Size: MWS) and a range (New Window Size: NWS) to the current frame after change of the available bandwidth is set to the preset range. Further, when the available bandwidth range is changed in the I frame, the preset range has a size of zero. Therefore, it is impossible to calculate an average value for quantization parameters of a plurality of frames. In this case, when the available bandwidth is increased, a quantization parameter may be calculated as defined by equation (1). When the available bandwidth is decreased, a quantization parameter may be calculated as defined by equation (2).

$$QP_I(i)=QP(i-1)-k \quad (1)$$

$$QP_I(i)=QP(i-1)+k \quad (2)$$

In equations (1) and (2), $QP_I(i)$ is a quantization parameter of a current I frame, $QP(i-1)$ is a quantization parameter of a previous frame, and k is a preset constant.

Meanwhile, returning to step 150, the encoding controller 23 identifies a type of the current incoming frame, and when the current incoming frame is not a first frame of GOP, (i.e., the I frame) (if no in step 150), the encoding controller 23 proceeds to step 160.

In the procedure of encoding, the encoding controller 23 generates information about a quantization parameter size, a cumulated average output bit, and a buffer size and then decides whether the next frame is a skip frame or not referring to the generated information. In step 160, the encoding controller 23 identifies whether the current frame is a skip frame referring results decided in the procedure of encoding a previous frame. When the current frame is not a skip frame (if no in step 160), the encoding controller 23 estimates a target bit of the current frame at step 170. For example, a target bit (Bittaget) of the current frame ($i^{th}$ frame) can be calculated through equation (3).

$$T_{b,i} = \beta \frac{R_{b,i}}{N_{Pr,i}}(1-\beta)\left[\frac{b_r}{f_r} - \Gamma(CBF_{i-1} - TBL_i)\right] \quad (3)$$

In equation (3), $N_{Pr,i}$ indicates the number of un-encoded P frame before encoding the current frame ($i^{th}$ frame), and β and Γ are constants (generally, each of them has a value of 0.5 and 0.75), $b_r$ is a preset bit rate (bit/sec), and $f_r$ is a preset frame rate (frame/sec). For Current Buffer Fullness (CBF) and Target Buffer Level(TBL), $CBF_i$ is a value of a state where the current frame ($i^{th}$ frame) is encoded and stored in a buffer, and $TBL_i$ is a level of the target buffer of the current frame ($i^{th}$ frame).

Also, the $R_{b,i}$ is defined as equation (4).

$$R_{b,i} = \begin{cases} (N_p+1) \times b_r/f_r & i=1 \\ R_{b,i-1} + \left[(N_p+2-i)\frac{(b_{r,i}-b_{r,i-1})}{f_r}\right] - G_{b,i-1} & i=2,3,\ldots,N_{p+1} \end{cases} \quad (4)$$

In equation (4), $N_p$ indicates the number of total P frames of corresponding GOP, and $b_{r,i}$ and $G_{b,i}$ each indicate an available bandwidth, and a bit generated in an $i^{th}$ frame.

Also, in step 170, a Mean Absolute Difference (MAD) is calculated in order to measure its complexity.

Although it is assumed in the above description that an MAD is calculated in order to identify the complexity in the embodiment of the present invention, the scope of the invention is not to be limited by the above embodiment. For example, it is possible to employ various other methods, such as a method which is disclosed in "M. Jiang, X. Yi, and N. Ling, "Improved frame-layer rate control for H.264 using MAD ratio," IEEE International Symposium on Circuits and Systems, vol. III, pp. 813-816, May 2004, Vancouver, Canada."

In step 180, a target bit value and an MAD are used to calculate a quantization parameter of P frame. The calculation of the quantization parameter can be calculated through equation (5).

$$Bit_{target} = X1 \times \frac{MAD}{QP} + X2 \times \frac{MAD}{QP^2} \quad (5)$$

In equation (5), X1 and X2 are model parameters decided in a procedure of encoding a previous frame (see step 200).

Further, in setting a quantization parameter, the change amount of quantization parameters is limited within a predetermined range. However, when the change amount of the quantization parameters is limited within the predetermined range, it is difficult to reflect change in the wireless channel environment in real-time for moving picture data encoding even if the wireless channel environment is changed. Therefore, when a range to a current frame after change of the available bandwidth is a range including one frame, it is preferred that a quantization parameter is set to be changeable without limitation of a change amount. Furthermore, in another aspect, it is possible to limit the change amount of the quantization parameter to 50% when a newly set range is lower than or equal to a preset threshold (e.g. 3 frames), and to limit the change amount of the quantization parameter to 25% when the newly set range is higher than the preset threshold.

Although it is assumed in the above description that the change amount of the quantization parameters (50%, and 25%) is limited by comparing the size of the newly set range with the preset threshold in the embodiment of the present invention, the scope of the invention is not to be limited by the above embodiment. It would be recognized that it is possible to apply various modifications to the present invention, without changing the scope of the invention Meanwhile, when the current frame is a skip frame (if yes in step 160), the encoding controller 23 proceeds directly to step 190 without performing steps 170 and 180 for calculating quantization parameters.

In step 190, the current frame encoding is performed in consideration of the control information (e.g. a frame type, a quantization parameter, and use or non-use of the ERT) generated in the above-described steps.

When the current frame encoding is completed, model parameters (X1 and X2) for calculating a quantization parameter of a next P frame are calculated (step 200).

Next, a buffer within the transmitting apparatus is checked to identify how much amount of data is stored in the buffer (step 210).

Then, when data stored in the buffer exceeds the preset threshold, the encoding controller 23 decides to skip the next frame (step 220). Also, in step 220, when the average value of the quantization parameters within the preset range (window size) is lower than or equal to the threshold of a preset quantization parameter, and a cumulated output hit is higher than or equal to the threshold of a preset output bit, the encoding controller 23 decides to skip the next frame. Herein, the number of sequentially skippable frames that are set is based on the quantization parameter and the output bit may be differently applied depending on the available bandwidth.

Next, the encoding controller 23 checks if the connection of the transmitting apparatus to the wireless channel is terminated. When it is determined that the connection is not terminated, steps 110 to 220 are repeatedly performed. In contrast, when it is determined that the connection is terminated, encoding and transmission procedure of the moving picture data are terminated (step 230).

In transmitting a moving picture through an image data transmitting/receiving application in real-time by the data transmitting/receiving apparatus and the data transmitting/receiving method, by using wireless channel information (e.g. an available bandwidth, location or non-location within an hand-over area, or location or non-location within a shadow zone) of a transmitter and a receiver, it is possible to control moving picture encoding so that a quantization parameter of the video encoder, a skip or non-skip of a frame, a frame type, and use or non-use of the ERT can be varied in a frame unit, so that it is possible to improve quality of transmitted/received image. Moreover, it is possible to improve characteristics of loss, delay, and jitter of a receiving image.

Alternatively, the moving picture data transmitting/receiving system may be constructed with a plurality of transmitting/receiving apparatuses, each of which may be constructed with the transmitting apparatus and the receiving apparatus.

Figure 4:
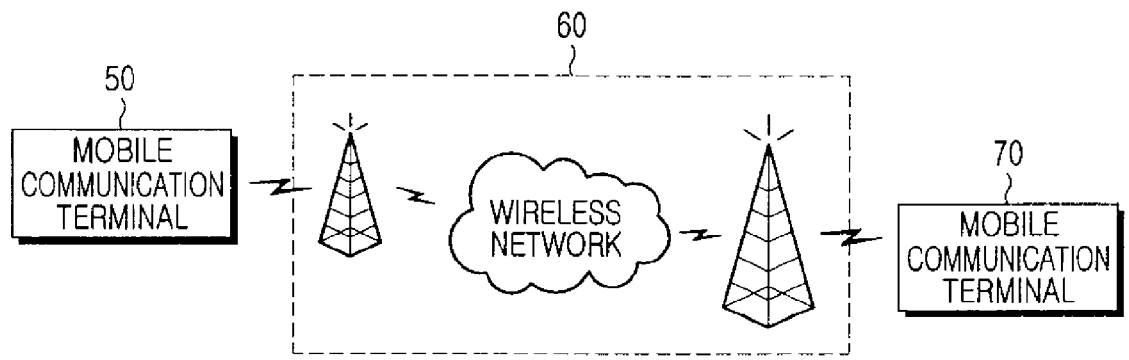
FIG. 4 is a conceptual diagram illustrating a system for transmitting/receiving moving picture data according to another embodiment of the present invention.
Figure 5:
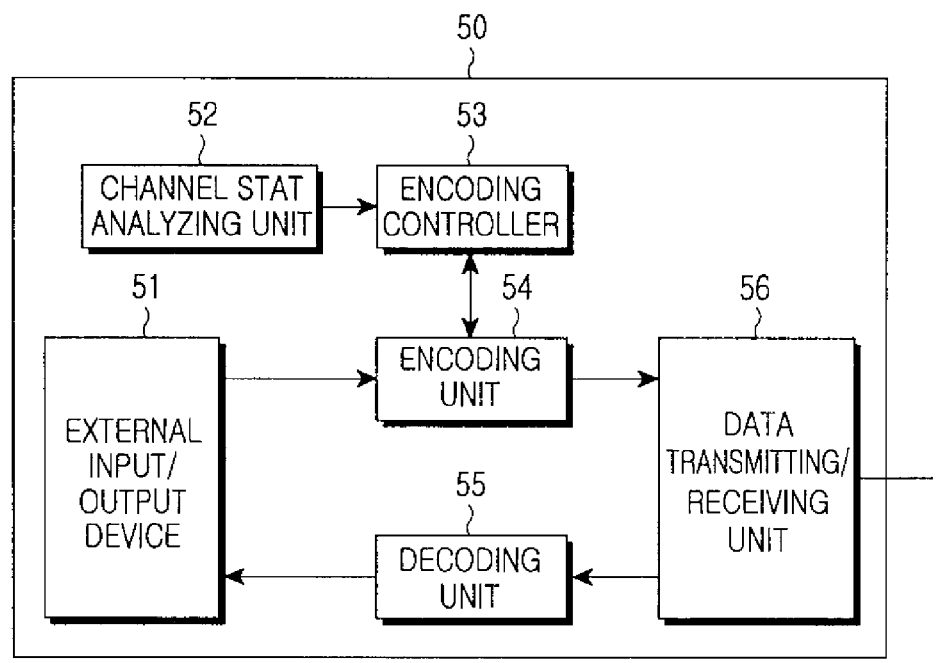
FIG. 5 is a block diagram illustrating a construction of a mobile communication terminal provided within a system for transmitting/receiving moving picture data according to another embodiment of the present invention.

FIG. 4 is a conceptual diagram illustrating a system for transmitting and receiving moving picture data according to another embodiment of the present invention, and FIG. 5 is a block diagram illustrating a construction of a mobile communication terminal that acts as an apparatus for transmitting/receiving moving picture data and is provided within a system for transmitting and receiving moving picture data, according to another embodiment of the present invention.

Referring to FIG. 4, the moving picture data transmitting/receiving system according to another embodiment of the present invention includes a plurality of mobile communication terminals (represented as terminals 50 and 70), and a wireless network 60 through which the mobile communication terminal 50 is interconnected to the mobile communication terminal 70.

Referring to FIG. 5, the mobile communication terminal 50 includes all constructions of the transmitting apparatus The external input/output device 51 includes a camera for receiving moving picture data, and a display for displaying moving picture data so that a user can visually review the moving picture data.

An encoding controller 53 and an encoding unit 54 are constructions similar to the encoding controller 23 and the encoding unit 25 provided in the transmitting apparatus disclosed previously. The decoding unit 55 is a construction corresponding to the decoding unit 33 provided in the receiving apparatus, and both decoding units perform the same function.

When the mobile communication terminal 50 acts as an apparatus for transmitting the moving picture data, the channel state analyzing unit 52 of the mobile communication terminal 50 analyzes a wireless channel state of the transmitting side, and the data transmitting/receiving unit 56 of the mobile communication terminal 50 transmits the encoded moving picture data to the mobile communication terminal 70 of the receiving side via the wireless network. At the same time, when the mobile communication terminal 50 acts as an apparatus for receiving moving picture data, the channel state analyzing unit 52 analyzes a wireless channel state of the receiving side and then transfers the analyzation result to the mobile communication terminal of the transmitting side. Also, the data transmitting/receiving unit 56 receives the moving picture data transferred from the mobile communication terminal of the transmitting side, converts the moving picture data into signals that the decoding unit 55 can recognize, and then transfers the converted signals.

When a moving picture is transmitted in real-time through a wireless network by using moving picture data transmitting/receiving application, it is possible to identify wireless channel information of a transmitter and a receiver (an available bandwidth, location or non-location within an hand-over area, and location or non-location within a shadow zone), and to control a quantization parameter of an video encoder, a skip or non-skip of frame indication, a frame type, and use or non-use of an ERT based on the wireless channel information, thereby improving quality of receiving image.

Moreover, due to improvement of the characteristics of loss, delay, and Jitter for a received image, it is also possible to improve QoS of a video in the application field of moving picture telephony, moving picture conference, portable broadcasting, and so on.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An apparatus for transmitting/receiving data through a wireless communication network connected to the apparatus, the apparatus comprising:
- a channel state analyzing unit for analyzing a wireless channel environment and for generating an analyzation result;
- an encoding controller for generating a control message containing a quantization parameter, a skip or non-skip of frames indication, a frame type, and a use or non-use of an Error Resilient Tool (ERT) indication, using the analyzation result received from the channel state analyzing unit;
- a moving picture encoding unit, responsive to receiving the control message, for encoding incoming moving picture data using the control message received from the encoding controller; and
- a data transmitting/receiving unit for transferring the encoded moving picture data through the wireless channel to an exterior.

2. The apparatus as claimed in claim 1, wherein the encoding controller identifies an available bandwidth of the wireless channel environment and generates said control message containing the quantization parameter or the skip or non-skip of frames indication, and the indication of non-use of the ERT when the wireless channel environment corresponds to a shadow zone or of use of the ERT when the wireless channel environment does not correspond to shadow zone.

3. The apparatus as claimed in claim 2, wherein the encoding controller sets an average value of quantization parameters of frames within a preset range to a quantization parameter of an I frame.

4. The apparatus as claimed in claim 3, wherein the preset range is set to comprise a smaller number of frames between the initially set frames and the number of frames to a current frame after change of the available bandwidth.

5. The apparatus as claimed in claim 3, wherein the encoding controller increases or decreases a quantization parameter of a previous frame to set the resulting parameter to the quantization parameter of an I frame, when an indication that the available bandwidth has been changed is received just before an I frame encoding.

6. The apparatus as claimed in claim 2, wherein the encoding controller adetermines the quantization parameter based on a relationship between a wireless channel available bandwidth and encoding complexity, and does not limit change the amount of the quantization parameter of a next frame when an indication that available bandwidth has been changed is received.

7. The apparatus as claimed in claim 2, wherein the encoding controller sets a skip of encoding of a next frame when a buffer size exceeds a preset threshold.

8. The apparatus as claimed in claim 2, wherein the encoding controller sets a skip of encoding of a next frame when the quantization parameter of the range is lower than or equal to a preset quantization parameter value and a cumulative output bit is higher than or equal to a preset output bit value.

9. The apparatus as claimed in one of claim 1, wherein the data transmitting/receiving unit further includes a function of receiving data transferred from the exterior, and further includes a decoding unit for decoding the moving picture data received through the data transmitting/receiving unit.

10. A method for encoding and transmitting moving picture data by a data transmitting/receiving apparatus connected to a wireless communication network, the method comprising the steps of:
- analyzing a channel environment by identifying a wireless channel state;
- generating an analyzation result from the analyzing of the channel environment;
- generating control message containing a quantization parameter, a skip or non-skip of frame indication, a frame type, and use or non-use of an ERT indication, using the analyzation result of the wireless channel environment;
- receiving the control message at an encoding unit;
- encoding moving picture data using the control message; and
- transferring the encoded moving picture data through the wireless channel.

11. The method as claimed in claim 10, wherein, in the step of analyzing the channel environment, an available bandwidth of the wireless channel is identified and whether the wireless channel environment is an environment in which hand-over or an a shadow zone is determined,
wherein the step of generating the control information further comprises the steps of:
- setting the ERT indication when the environment within a range of the shadow zone; and
- generating the control message to include at least one information selected from the quantization parameter and the skip or non-skip of frames indication, or information constructed with a combination of both.

12. The method as claimed in claim 11, wherein the step of generating the control message; comprises:
- determining an average value of quantization parameters of frames within the preset range is set to a quantization parameter of an I frame.

13. The method as claimed in claim 12, wherein; the step of generating the control message comprises:
- setting the preset range is set to a smaller number of frames between the initially set frames and the number of frames to a current frame after change of the available bandwidth.

14. The method as claimed in claim 11, wherein the step of generating the control message comprises:
- when an indication that the available bandwidth has been changed is received just before encoding of an I frame, the quantization parameter of a previous frame is either increased or decreased, and then the resulting quantization parameter is set to a quantization parameter of an I frame.

15. The method as claimed in claim 11, wherein, in the step of generating the control message, a quantization parameter of a P frame is determined in consideration of relationship between an available bandwidth of a wireless channel and encoding complexity, and when the indication that the available bandwidth has been changed is received, the change amount of the quantization parameter of a next frame is not limited.

16. The method as claimed in claim 11, wherein, when a buffer size exceeds a preset threshold, encoding of a next frame is skipped.

17. The method as claimed in claim 11, wherein the encoding of the next frame is skipped when the quantization parameter of the range is lower than or equal to a preset quantization parameter value and a cumulated output bit is higher than or equal to a preset output bit value.

18. A data transmitting/receiving system comprising:
- a wireless communication network;
- a data transmitting apparatus connected to the wireless communication network, wherein the data transmitting apparatus includes:

a channel state analyzing unit for analyzing a wireless channel environment of a transmitting side and for generating an analyzation result, an encoding controller for generating a control message containing a quantization parameter, a skip or non-skip of frames indications, a frame type indication, and use or non-use of an ERT indication, using the analyzation result for the wireless channel environment received from the channel state analyzing unit;

a moving picture encoding unit, responsive to receiving the control message, for encoding incoming moving picture data base using the control message received from the encoding controller, and a communication module of the transmitting side for transferring the encoded moving picture data to an exterior through a wireless channel;

a data receiving apparatus connected to the wireless communication network, wherein the data receiving apparatus includes:

a communication module of a receiving side for receiving data transferred from the wireless communication network, and a decoding unit for decoding the moving picture data received through the communication module of the receiving side.

19. The system as claimed in claim 18, wherein the encoding controller identifies an available bandwidth of the wireless channel and determines the quantization parameter or the skip or non-skip of frames indication, and sets the ERT indication to not use when the wireless channel environment corresponds to a shadow zone and sets the ERT indication to use when the wireless channel environment does not correspond to the shadow zone.

20. The system as claimed in one of claim 18, wherein the data receiving apparatus further comprises:

a channel state analyzing unit for:

performing an analysis of a wireless channel environment with regard to the receiving side, determining occurrence or non-occurrence of frame loss, and transferring results of the analysis to the channel state analyzing unit of the data transmitting apparatus, via the wireless communication network.

* * * * *

UNITED STATES PATENT AND TRADEMARK OFFICE
CERTIFICATE OF CORRECTION

PATENT NO.          : 8,295,348 B2
APPLICATION NO.     : 12/176506
DATED               : October 23, 2012
INVENTOR(S)         : Yong-Gyoo Kim et al.

It is certified that error appears in the above-identified patent and that said Letters Patent is hereby corrected as shown below:

In the Claims

Column 11, Claim 6, Line 44 should read as follows:
--...controller determines the...--

Column 11, Claim 9, Line 58 should read as follows:
--...as claimed in claim 1...--

Column 12, Claim 10, Line 5 should read as follows:
--...generating a control message...--

Column 12, Claim 11, Line 19 should read as follows:
--...hand-over or a shadow...--

Column 14, Claim 20, Line 12 should read as follows:
--...as claimed in claim 18...--

Signed and Sealed this
Sixth Day of August, 2013

Teresa Stanek Rea
*Acting Director of the United States Patent and Trademark Office*